(12) United States Patent
Tweedy (10) Patent No.: US 12,379,061 B2
(45) Date of Patent: Aug. 5, 2025

(54) THREADED TUBULAR END PROTECTOR

(71) Applicant: Tweedy's Speed Protectors, LLC, Eufaula, OK (US)

(72) Inventor: Neil E. Tweedy, Henryetta, OK (US)

(73) Assignee: FPT Technologies LLC, Oklahoma City, OK (US)

( * ) Notice: Subject to any disclaimer, the term of this patent is extended or adjusted under 35 U.S.C. 154(b) by 233 days.

(21) Appl. No.: 18/071,781

(22) Filed: Nov. 30, 2022

(65) Prior Publication Data

US 2023/0085768 A1 Mar. 23, 2023

Related U.S. Application Data

(63) Continuation-in-part of application No. 17/885,064, filed on Aug. 10, 2022, now Pat. No. 11,667,445, which is a continuation-in-part of application No. 17/718,015, filed on Apr. 11, 2022, now Pat. No. 11,473,715, which is a continuation-in-part of application No. 17/517,303, filed on Nov. 2, 2021, now Pat. No. 11,454,344, which is a continuation-in-part of application No. 17/360,641, filed on Jun. 28, 2021, now Pat. No. 11,313,503.

(Continued)

(51) Int. Cl.
*F16L 57/00* (2006.01)

(52) U.S. Cl.
CPC .................. *F16L 57/005* (2013.01)

(58) Field of Classification Search
CPC ........ F16L 57/005; B65D 59/06; B65D 59/02
USPC ....................................................... 138/96 T
See application file for complete search history.

(56) References Cited

U.S. PATENT DOCUMENTS

| 676,976 A | 6/1901 | Bossert |
|---|---|---|
| 1,457,882 A | 6/1923 | Shrum |

(Continued)

FOREIGN PATENT DOCUMENTS

DE 2840742 A1 3/1980

OTHER PUBLICATIONS

PCT/US2021/039400; "International Search Report and Written Opinion"; mailed Oct. 6, 2021; 10 pages.

(Continued)

*Primary Examiner* — David R Deal
(74) *Attorney, Agent, or Firm* — Hall Estill Law Firm (57) ABSTRACT

A thread protector that has an external sleeve to protect threads disposed on a tubular member. The thread protector includes a flange disposed on a first end of the external sleeve to be engageable with an end of the tubular member. The thread protector also includes a securing apparatus extending from the flange to frictionally engage an inner side of the tubular member to maintain the thread protector's engagement with the tubular member, the securing apparatus including a magnet that increases the force of the frictional engagement of the securing apparatus with the inner side of the tubular member. The securing apparatus can also extend from the flange to frictionally engage an inner side of the tubular member to maintain the thread protector's engagement with the tubular member, the securing apparatus rotatable relative to the external sleeve. A method of protecting pin threads of pin ends of tubular members by installing a thread protector on an end of a tubular member.

16 Claims, 11 Drawing Sheets

Related U.S. Application Data (60) Provisional application No. 63/045,317, filed on Jun. 29, 2020.

(56) References Cited

U.S. PATENT DOCUMENTS

| | | | |
|---|---|---|---|
| 1,600,860 A | | 9/1926 | Young |
| 1,639,814 A | | 8/1927 | Shrum |
| 1,692,710 A | | 11/1928 | Spahn |
| 1,774,569 A | | 9/1930 | Shrum |
| 1,785,985 A | | 12/1930 | Shrum |
| 1,847,396 A | * | 3/1932 | Hochenauer ........... B65D 59/06 138/96 T |
| 1,885,375 A | * | 11/1932 | Ponce ................... F16L 57/005 138/96 T |
| 2,156,169 A | | 4/1939 | Unke |
| 2,195,530 A | * | 1/1940 | Curtis ................... B65D 59/06 138/96 T |
| 2,810,401 A | | 10/1957 | Stansbury |
| 2,898,944 A | | 11/1959 | Seward et al. |
| 2,977,993 A | | 4/1961 | Scherer |
| 3,744,528 A | | 10/1973 | Vestal |
| 4,020,873 A | * | 5/1977 | Palarino ................ F16L 57/005 138/96 T |
| 4,036,261 A | | 7/1977 | Hauk |
| 4,157,100 A | * | 6/1979 | Turk .................... F16L 57/005 138/96 T |
| 4,185,665 A | | 1/1980 | Flimon |
| 4,210,179 A | | 7/1980 | Galer |
| 4,733,888 A | | 3/1988 | Toelke |
| 5,148,835 A | | 9/1992 | Clark |
| 5,303,743 A | | 4/1994 | Vincent |
| 5,706,860 A | | 1/1998 | Gonyea |
| 6,196,270 B1 | * | 3/2001 | Richards ................ B65D 59/06 138/96 T |
| 9,151,432 B1 | | 10/2015 | Yoder |
| 9,546,029 B1 | | 1/2017 | Keevert |
| 9,631,666 B1 | | 4/2017 | Colford |
| 2005/0166986 A1 | | 8/2005 | Dell'Erba et al. |
| 2014/0261849 A1 | | 9/2014 | Danneffel et al. |
| 2015/0034197 A1 | | 2/2015 | Schneider et al. |
| 2016/0039585 A1 | | 2/2016 | Danneffel et al. |
| 2019/0368281 A1 | | 12/2019 | Haggart |
| 2022/0057033 A1 | | 2/2022 | Tweedy |

OTHER PUBLICATIONS

PCT/US2021/059821; "International Search Report and Written Opinion"; mailed Mar. 24, 2022; 13 pages.

\* cited by examiner

THREADED TUBULAR END PROTECTOR

STATEMENT REGARDING FEDERALLY SPONSORED RESEARCH OR DEVELOPMENT

Not applicable.

CROSS-REFERENCE TO RELATED APPLICATIONS

The present application is a continuation-in-part application of U.S. patent application having U.S. Ser. No. 17/885,064, filed Aug. 10, 2022, which is a continuation-in-part application of U.S. patent application having U.S. Ser. No. 17/718,015, filed Apr. 11, 2022, which is a continuation-in-part application of U.S. patent application having U.S. Ser. No. 17/517,303, filed Nov. 2, 2021, which is a continuation-in-part application of U.S. patent application having U.S. Ser. No. 17/360,641, filed Jun. 28, 2021, which is a conversion of U.S. Provisional application having U.S. Ser. No. 63/045,317, filed Jun. 29, 2020, which claims the benefit under 35 U.S.C. 119(e). The disclosure of which is hereby expressly incorporated herein by reference.

BACKGROUND OF THE DISCLOSURE

1. Field of the Disclosure

The present disclosure relates to a thread protector for a threaded end of a unit of casing or tubing that can be quickly attached to and removed from the unit of casing or tubing. The present disclosure also relates to a method of attaching or removing the thread protectors from the pin end of the units of casing or tubing.

2. Description of the Related Art

Casing and/or tubing have a pin end and a box end. The box end includes threads inside, which are naturally protected by being disposed inside the tubing or casing. The pin end has threads on the outside of the tubing or casing that are exposed and can be damaged. Currently, there are protective devices for the pin end threads of the tubing or casing but they take a considerable amount of time to put on the tubing or casing and remove from the tubing or casing. When you multiply the time it takes to put on or remove a typical protector device from the pin end threads of multiple units of tubing or casing, it results in a large amount of time. This large amount of time is taken directly from production time of an oil or gas well.

Accordingly, there is a need for a thread protector for the threads of the pin end of the tubing or casing that can be more quickly placed on and/or removed from the pin end of the tubing or casing, but still protects all the threads of the pin end of the tubing or casing.

SUMMARY OF THE DISCLOSURE

The present disclosure is directed toward a thread protector that has an external sleeve to protect threads disposed on a tubular member. The thread protector includes a flange disposed on a first end of the external sleeve to be engageable with an end of the tubular member. The thread protector also includes a securing apparatus extending from the flange to frictionally engage an inner side of the tubular member to maintain the thread protector's engagement with the tubular member, the securing apparatus including a magnet that increases the force of the frictional engagement of the securing apparatus with the inner side of the tubular member.

The present disclosure is directed toward a thread protector that has an external sleeve to protect threads disposed on a tubular member. The thread protector includes a flange disposed on a first end of the external sleeve to be engageable with an end of the tubular member. The thread protector also includes a securing apparatus extending from the flange to frictionally engage an inner side of the tubular member to maintain the thread protector's engagement with the tubular member, the securing apparatus rotatable relative to the external sleeve.

The present disclosure is also directed toward a method of protecting pin threads of pin ends of tubular members. The method includes installing a thread protector on an end of a tubular member.

DETAILED DESCRIPTION OF THE DISCLOSURE

The present disclosure is directed to a thread protector 10 to guard or protect threads 12 on a pin end 14 of a tubular member 16. The tubular member 16 can be casing or tubing used in an oil and gas operation. The tubular member 16 also includes a box end 18 opposite the pin end 14, an internal side 20 and an external side 22. The box end 18 of the tubular member 16 includes internal threads 24 disposed therein on the internal side 20 of the tubular member 16. The threads 12 disposed on the external side 22 of the pin end 18 of the tubular member 16 can be a certain number of threads or extend along a certain length of the tubular member 16.

The thread protector 10 includes an external sleeve 26 that is sized to fit around the external side 22 of the tubular member 16 and have a length that is at least as long as the length of the threads 12 disposed on the pin end 14 of the tubular member 14. The external sleeve 26 can have an inner side 28, an outer side 30, a first end 32, and a second end 34. The inner side 28 of the external sleeve 26 can include at least one thread 36 to engage with the threads 12 disposed on the pin end 14 of the tubular member 16.

In one embodiment of the present disclosure, the thread protector 10 can also include a flange 38 inwardly directed in a radial direction from the first end 32 of the thread protector 10. The flange 38 is positioned so that the pin end 14 of the tubular member 16 can engage the flange 38 to maintain the thread protector 10 in a protective position with respect to the threads 12 on the pin end 14 of the tubular member 16. In another embodiment, an internal sleeve 40 can extend from an inner diameter 42 of the flange 38 in the same direction of the external sleeve 26 of the thread protector 10. The internal sleeve 40 is sized to extend back into the inside of the tubular member 16 to provide additional structural support for the thread protector 10. In another embodiment, a plate 44 can be attached to the first end 32 of the external sleeve 26 instead of the flange 38 to prevent debris from getting inside the tubular member 16 when the tubular member 16 is not in use.

The inner side 28 of the external sleeve 26 of the thread protector 10 can have any number of consecutive threads such that the thread protector 10 can be quickly removed and/or replaced from the tubular member 16. The threads 12 disposed on the inner side 28 of the external sleeve 26 of the thread protector 10 are positioned close to the flange 38 of the thread protector 10 so that when the thread protector 10 engages with the threads 12 of the pin end 14, the threads 12 of the thread protector 10 only engage with the threads 12 at the end of the pin end 14 of the tubular member 16. If a limited number of the threads on the tubular member 16 are engaged to secure the thread protector 10 thereto, then the reduction in time it would take to remove the thread protector 10 from the tubular member 16, and the time it would take to secure the thread protector 10 to the tubular member 16, when combined for numerous tubular members, would be significant.

In one embodiment, the number of threads 12 on the inner side 28 of the external sleeve 26 of the thread protector 10 can be less than ten threads. In another embodiment, the number of threads 12 on the inner side 28 of the external sleeve 26 of the thread protector 10 can be less than eight threads. In a further embodiment, the number of threads 12 on the inner side 28 of the external sleeve 26 of the thread protector 10 can be less than 6 threads. In yet another embodiment, the number of threads 12 on the inner side 28 of the external sleeve 26 of the thread protector 10 can be less than 4 threads. In another embodiment, the number of threads 12 on the inner side 28 of the external sleeve 26 of the thread protector 10 can be less than 3 threads. In a further embodiment, the number of threads 12 on the inner side 28 of the external sleeve 26 of the thread protector 10 can be less than 2 threads.

The threads 12 on the pin end 14 of the tubular member 16 can extend along a certain length of the tubular member 16. The engaged threads (threads extending from the end of the pin end of the tubular member that are engaged by the threads of the thread protector) extend a certain percentage of the length of all the threads 12 on the pin end 14 of the tubular member 16. In one embodiment, the length of the engaged threads are less than about 40 percent of the total length of all the threads 12 on the pin end 14 of the tubular member 16. In another embodiment, the length of the engaged threads are less than about 30 percent of the total length of all the threads 12 on the pin end 14 of the tubular member 16. In a further embodiment, the length of the engaged threads are less than about 25 percent of the total length of all the threads 12 on the pin end 14 of the tubular member 16. In yet another embodiment, the length of the engaged threads are less than about 20 percent of the total length of all the threads 12 on the pin end 14 of the tubular member 16. In an even further embodiment, the length of the engaged threads are less than about 10 percent of the total length of all the threads 12 on the pin end 14 of the tubular member 16. In another embodiment, the length of the engaged threads are less than about 5 percent of the total length of all the threads 12 on the pin end 14 of the tubular member 16.

Referring now to FIGS. 4A-7B, shown therein is another embodiment of a thread protector 10 that has a securing apparatus 46 that is selectively securable to the thread protector 10. The securing apparatus 46 can extend inside the tubular member 16. In this embodiment, the securing apparatus 46 can be removable from the thread protector 10 and exchanged with other sized securing apparatuses 46 so that the thread protector 10 can fit multiple size tubular members 16. The securing apparatus 46 can include a plurality of U-shaped fingers 112 that have a first leg 114 that extends toward the flange 38 and a second leg 116 that extends from a base portion 118 of the securing apparatus 46. The base portion 118 of the securing apparatus 46 can be secured to a base member 120 that is supported by the flange 38. The first leg 114 of each U-shaped finger 112 moves further from the internal side 20 of the tubular member 16 as the first leg 114 moves from the direction of the flange 38 to a bottom 124 of each U-shaped finger 112. The base member 120 that engages with the securing apparatus 46 can have any shape desirable such that proper structural support is provided to the plurality of U-shaped fingers 112 of the securing apparatus 46. The base member 120 can extend down into the tubular member 16, or the base member 120 could be a plate that extends within the flange 38.

Engagement between the base portion 118 of the securing apparatus 46 and the base member 120 can be designed such that the securing member 46 can be selectively engaged. This permits different sized securing apparatuses 46 can be used with the thread protector 10 depending on the size of the tubular member 16 having the threads to be protected. The base portion 118 of the securing apparatus 46 can have protrusions 126 that extend therefrom that securely engage with openings 128 disposed in the base member 120. It should be understood that the protrusions could be on the base member 120 and the openings could be disposed in the base portion 118 of the securing apparatus 46. In one embodiment, the protrusions 126 can be L-shaped and the openings 128 can be sized such that the L-shaped protrusions can fit through. In one embodiment, the openings 128 can be slots that can permit a first leg 130 of the L-shaped protrusions 126 to pass there through and allow a second leg 132 (the portion that extends from the base portion 118 of the securing apparatus) to extend through the opening 128. In one embodiment, at least one of the openings 128 has a flex member 134 extending laterally into the opening 128. The flex member 134 allows the first leg 130 to pass through the opening 128 and permits the second leg 136 of the protrusion 126 to move past when the securing apparatus 46 is rotated relative to the base member 120 and the external sleeve 26 of the thread protector 10, but the flex member 134 does not easily permit the rotation of the base member 120 of the securing apparatus 46 to be rotated back the other way. The external sleeve 26 of this embodiment can include a slit 136 disposed therein to provide a pry point to remove the thread protector 10 in certain situations.

A pin end 14 of the tubular member 16 can be forced into the thread protector 10 such that a sidewall 138 of the tubular member 16 ends up being positioned between the external sleeve 26 of the thread protector 10 and each U-shaped finger 112. The tapering relationship between the first leg 114 of each U-shaped finger 112 creates a situation where, depending on the thickness of the sidewall 138, the sidewall 138 of the tubular member 16 gets securely wedged between the first leg 114 of each U-shaped finger 112. The tapering relationship and the U-shape of each finger 112 creates a larger distance between the bottom 124 of each U-shaped finger 112 and the inner side 28 of the external sleeve 26, which permits easier initial engagement with the tubular member 16. As the pin end 14 of the tubular member 16 is forced into engagement with the securing apparatus 46 of the thread protector 10, outer surfaces 140 of the first legs 114 of each U-shaped finger are flattened so that more surface area of the outer surfaces 140 can contact the internal side 20 of the tubular member 16 to better secure the thread protector 10 to the tubular member 16.

In yet another embodiment of the present disclosure, a debris sleeve 142 can be used with the thread protector 10 to create a thread protection system 144. The debris sleeve 142 can be implemented to prevent moisture and debris from damaging the threads 12 of the tubular member 16. The debris sleeve 142 is designed to cover a portion of the external sleeve 26 of the thread protector 10 and the external portion of the tubular member 16 adjacent to the external sleeve 26. The debris sleeve 142 can have a wider portion 146 that covers the external sleeve 26 of the thread protector 10 and a narrower portion 148 that covers the external portion of the tubular member 16. The wider portion 146 and the narrower portion 148 can each have a channel 150 disposed therein for receiving a band 152 (or strap) that can be tightened in the channels 150 to secure the engagement of the debris sleeve 142. In one embodiment, the external sleeve 26 can include a circumferential channel 154 disposed therein for receiving the channel 150 disposed in the wider portion 146 of the debris sleeve 142. The band 152 or strap can be any type of strap or band that can be tightened.

Referring now to FIGS. 8A-8G, shown therein is another embodiment of the thread protector 10 shown in FIGS. 4A-7B having a unique engagement between the base portion 118 of the securing apparatus 46 and the base member 120. In this embodiment, the base portion 118 of the securing apparatus 46 is rotatable relative to the base member 120. Similar to the embodiment shown in FIGS. 6A-7B, this permits different sized securing apparatuses 46 can be used with the thread protector 10 depending on the size of the tubular member 16 having the threads to be protected. The base portion 118 of the securing apparatus 46 can have protrusions 126 that extend therefrom that securely engage with a part of the base member 120. It should be understood that the protrusions 126 could be on the base member 120 and the part the protrusions 126 engaged with could be disposed in/on the base portion 118 of the securing apparatus 46. In one embodiment, the protrusions 126 can engage with an opening 162 disposed in the base member 120 to prevent axial separation of the base member 120 and the base portion 118, but permit the base member 120 and the base portion 118 to rotate relative to each other.

The opening 162 separates an inside part 164 of the base member 120 and an engagement side 166 that abuts an abutment side 168 of the base member 120. A sidewall 170 defines the opening 162 and has a certain depth. Each protrusion 126 can include an engaging end 172 that selectively engages the inside part 164 of the base portion 118 to secure the base member 120 and the base portion 118 in an axial direction and a post portion 174 that extends from the abutment side of the base member to the engagement end 172 of each protrusion 126. Each engagement end 172 can include a shoulder 176 that when the base member 120 and the base portion 118 are engaged, the shoulder 176 contacts the inside part 164 of the base member 120 and an angled portion 178 to permit the engagement ends 172 of be able to move up through the opening 162 and past the sidewall 170 when the base member 120 and the base portion 118 are connected. The post portion 174 is flexible which also allows the engagement end 172 of each protrusion to flex away from the sidewall 170 as the base member 120 and the base portion 118 are connected. The shoulders 176, the abutment side 168 of the base portion 118 and the post portions 174 of the protrusions 126 create a circumferential slot that accepts the sidewall 170 that creates the opening 162 and provides that area where the base member 120 and the base portion 118 will be permitted to rotate relative to each other.

Figure 1:
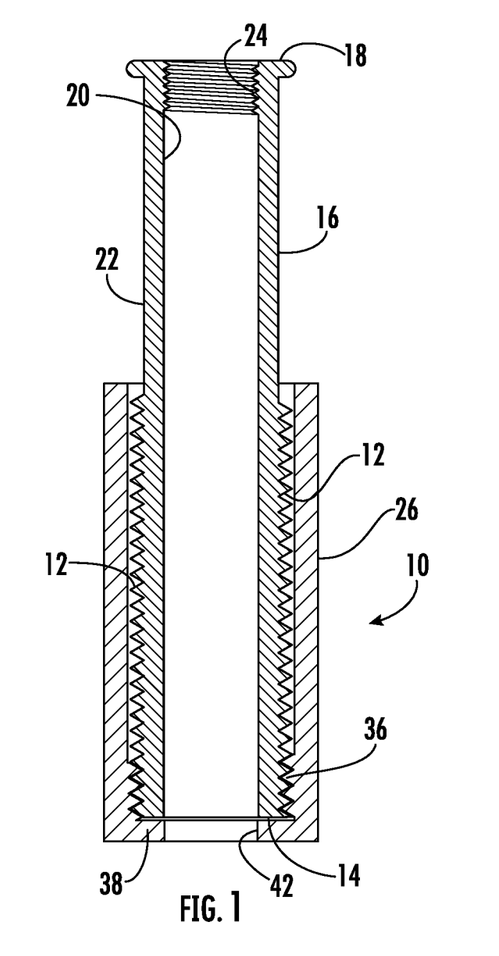
FIG. 1 is a cross-sectional view of a thread protector constructed in accordance with the present disclosure.
Figure 2:
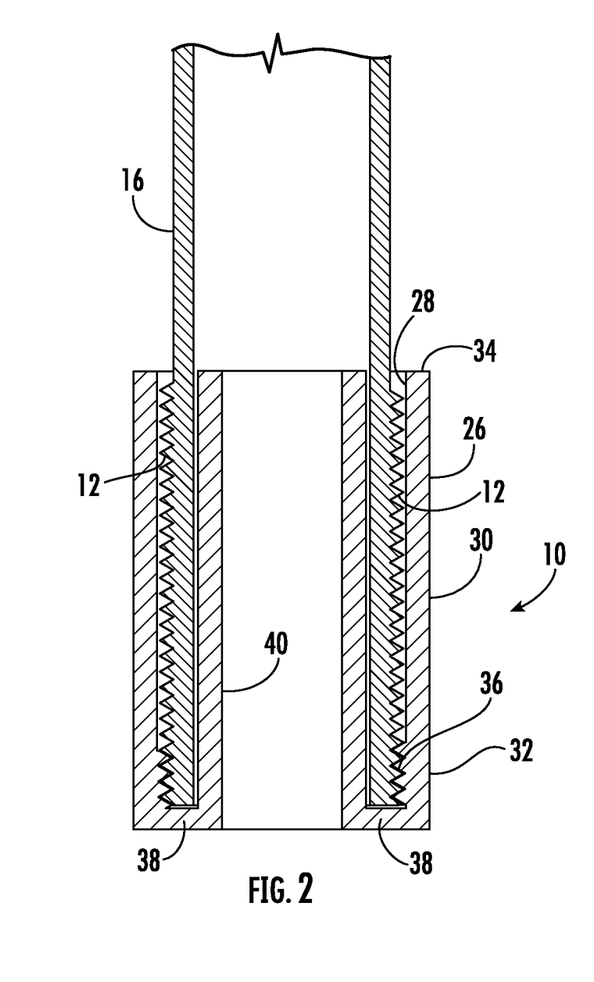
FIG. 2 is a cross-sectional view of another embodiment of the thread protector constructed in accordance with the present disclosure.
Figure 3A:
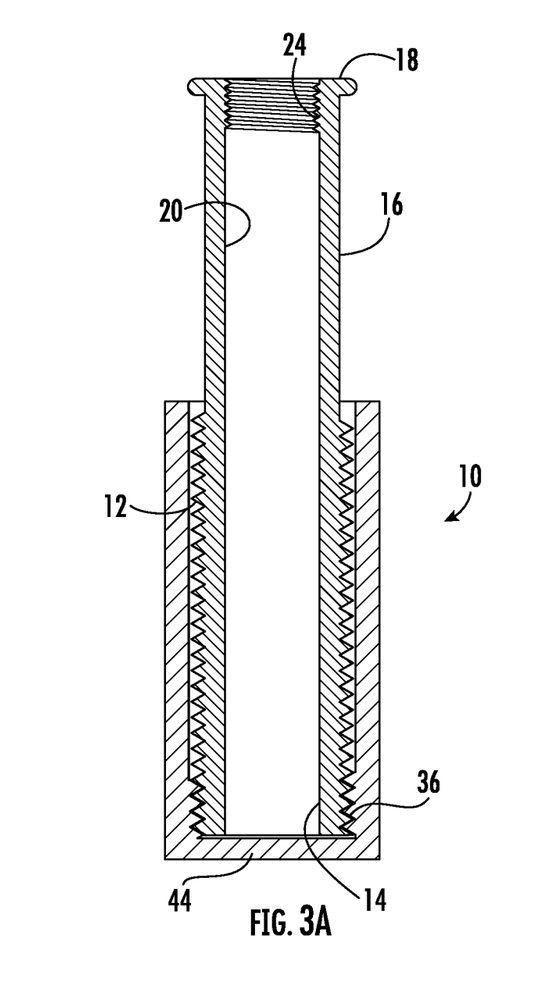
FIG. 3A is a cross-sectional view of yet another embodiment of the thread protector constructed in accordance with the present disclosure.
Figure 3B:
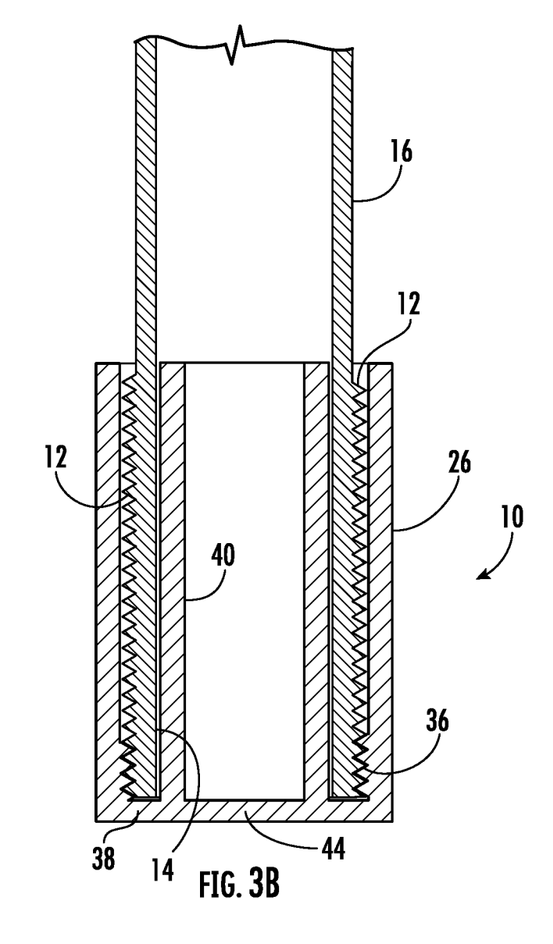
FIG. 3B is a cross-sectional view of a further embodiment of the thread protector constructed in accordance with the present disclosure.
Figures 4A, 4B:
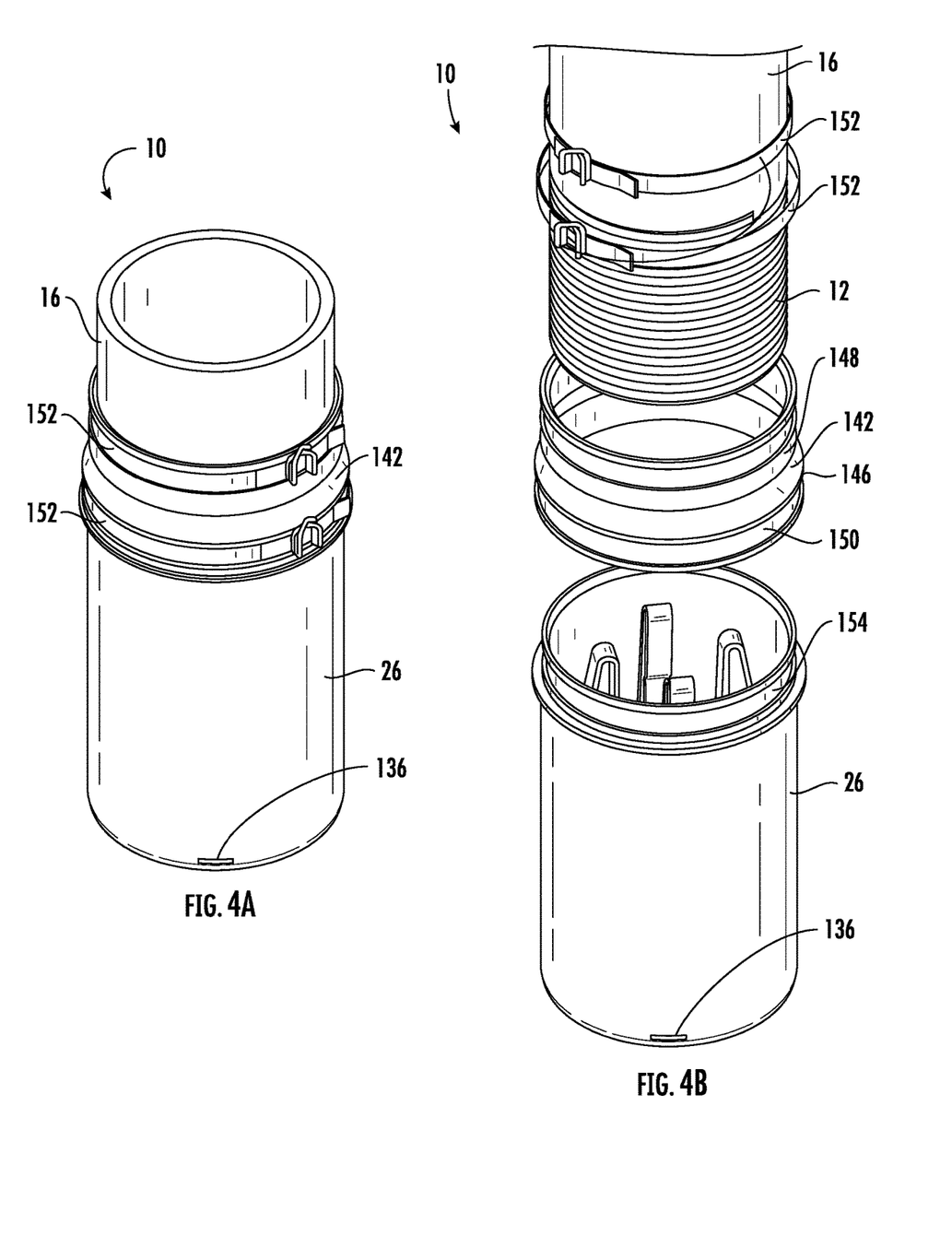
FIG. 4A is a perspective view of another embodiment of a thread protector constructed in accordance with the present disclosure.
FIG. 4B is an exploded view of the embodiment of the thread protector shown in FIG. 4A constructed in accordance with the present disclosure.
Figure 5A:
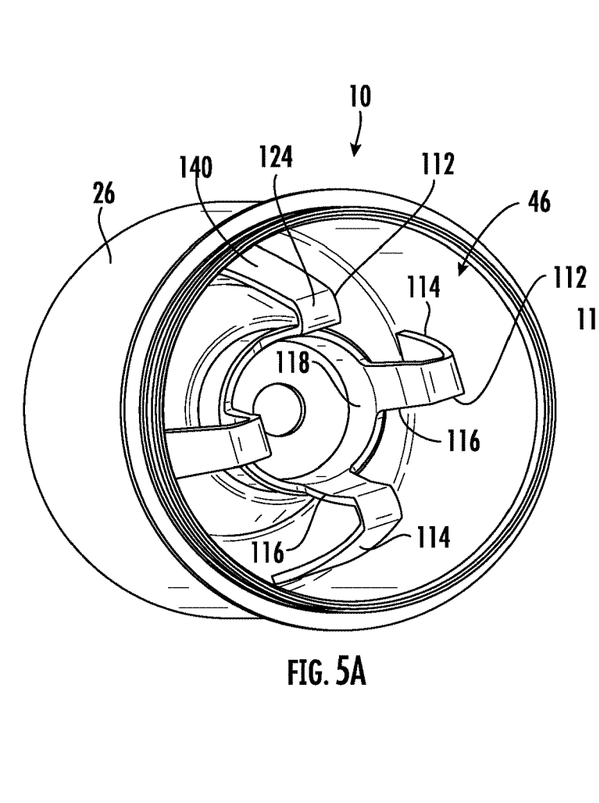
FIGS. 5A-5C are additional views of the thread protector shown in FIGS. 4A and 4B constructed in accordance with the present disclosure.
Figure 5B:
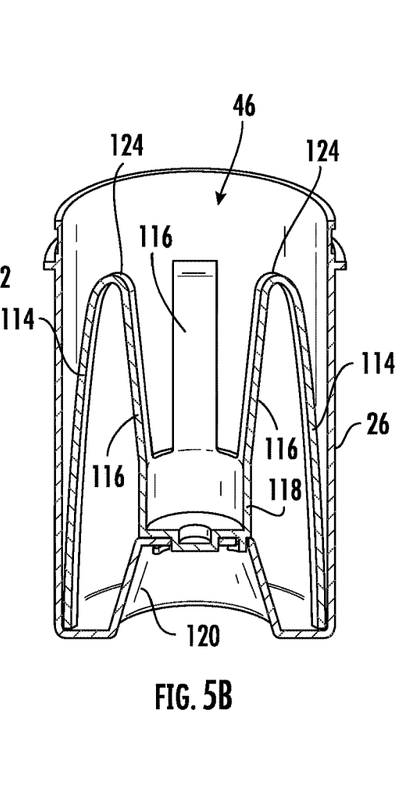
Figure 5C:
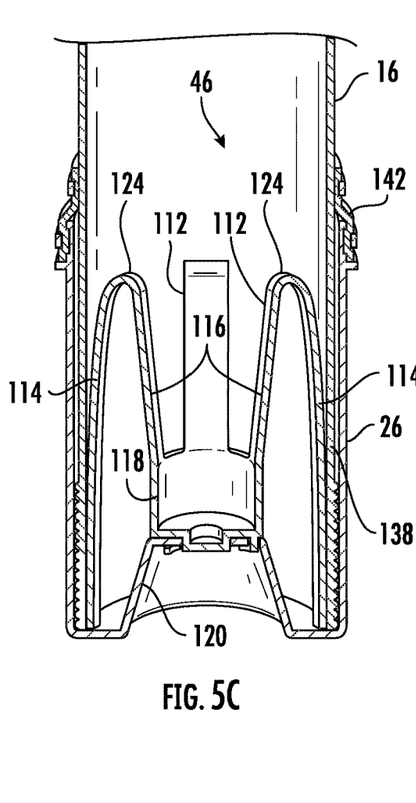
Figure 6A:
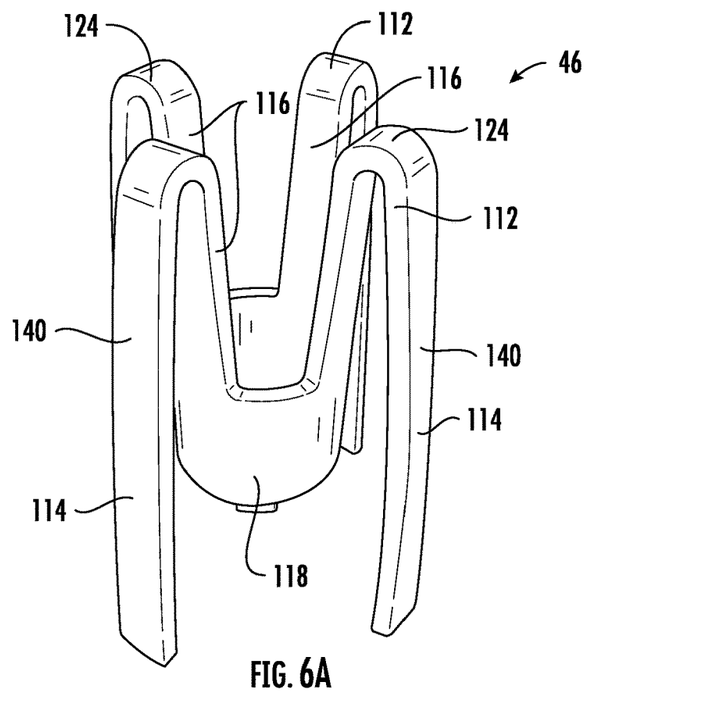
FIGS. 6A and 6B are perspective views of a portion of the thread protector shown in FIGS. 4A and 4B constructed in accordance with the present disclosure.
Figure 6B:
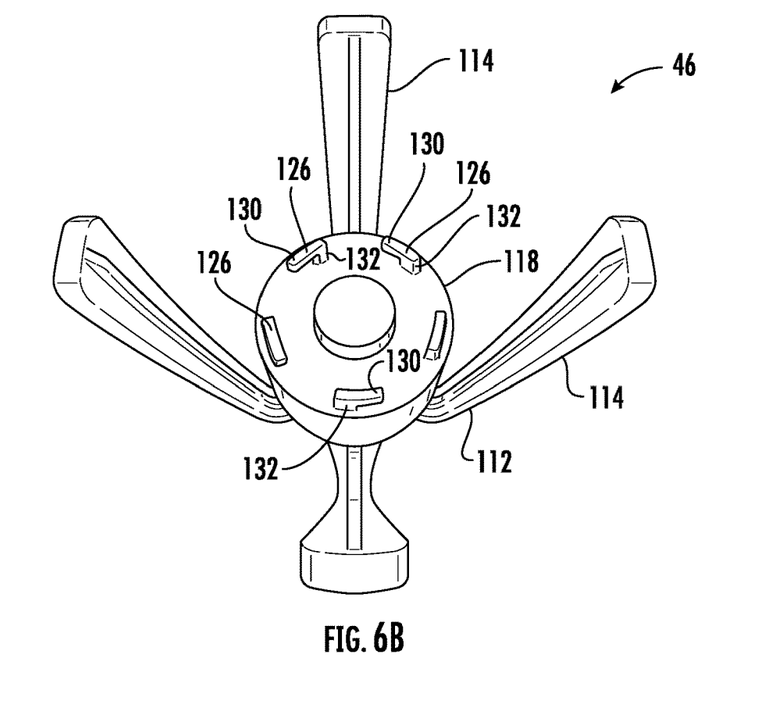
Figure 7A:
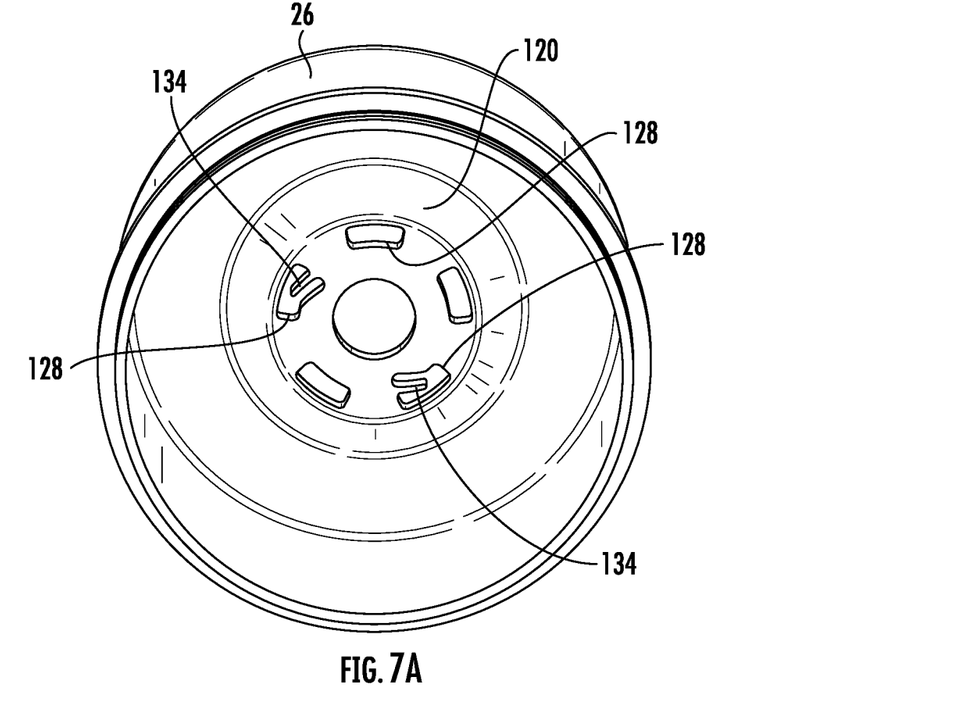
FIGS. 7A and 7B are additional views of another portion of the thread protector shown in FIGS. 4A and 4B constructed in accordance with the present disclosure.
Figure 7B:
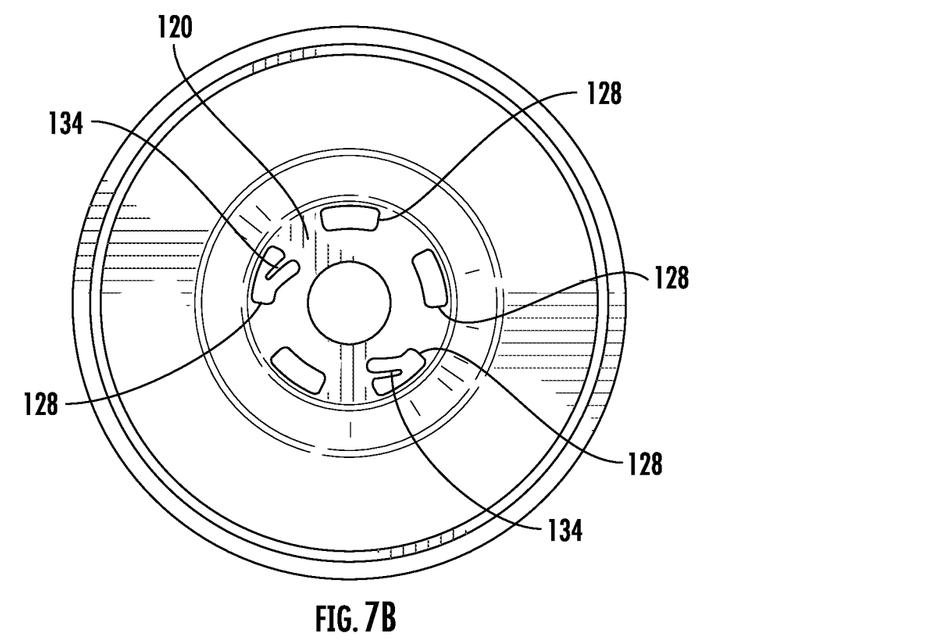
Figure 8A:
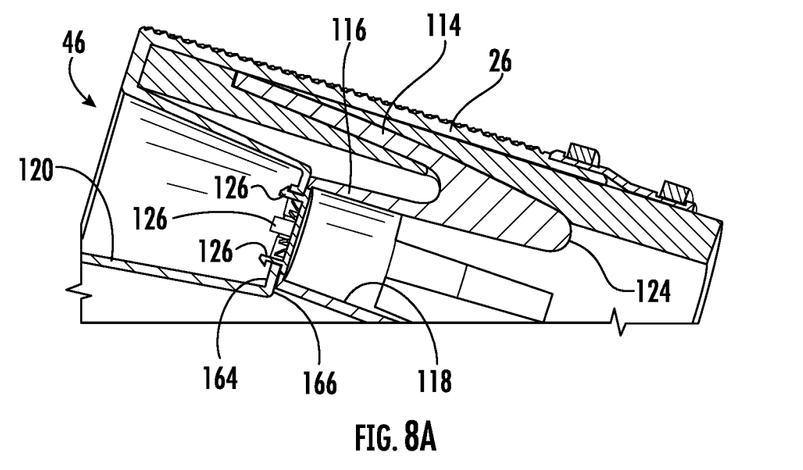
FIGS. 8A-8G are additional views of another portion of the thread protector shown in FIGS. 4A and 4B constructed in accordance with the present disclosure.
Figure 8B:
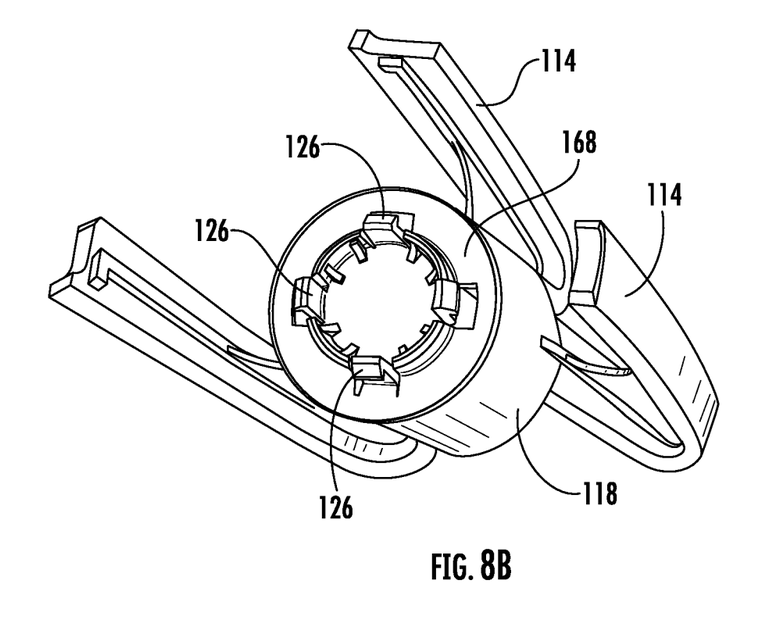
Figure 8C:
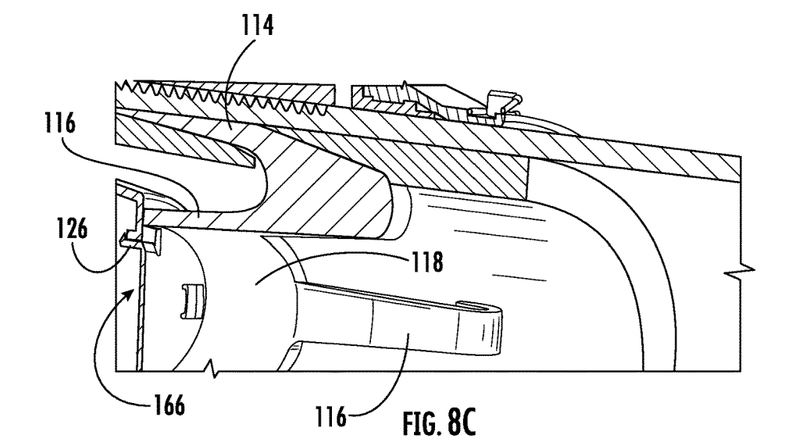
Figure 8D:
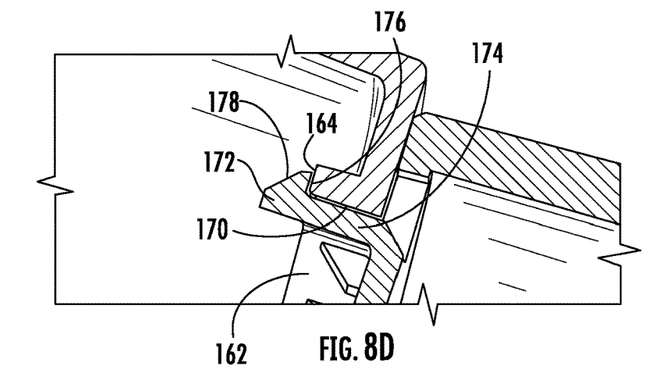
Figure 8E:
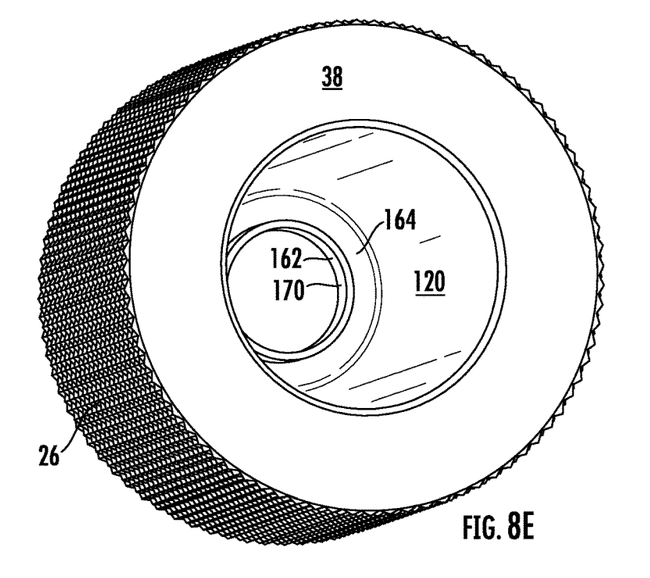
Figure 8F:
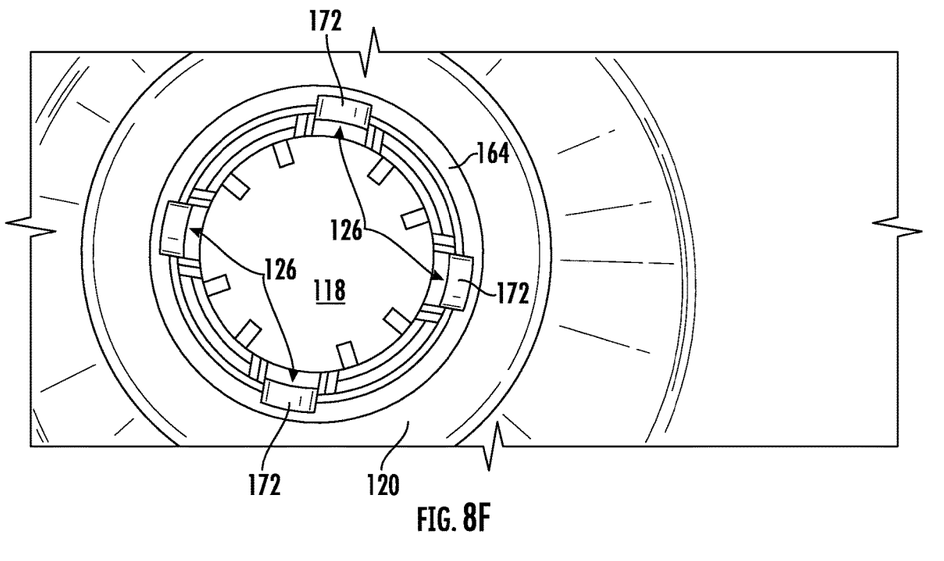
Figure 8G:
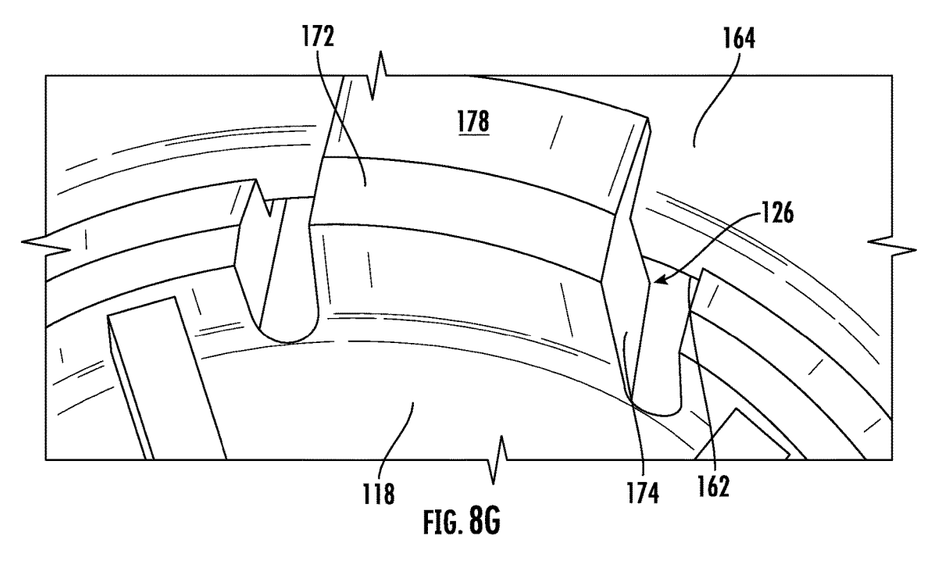
Figure 9A:
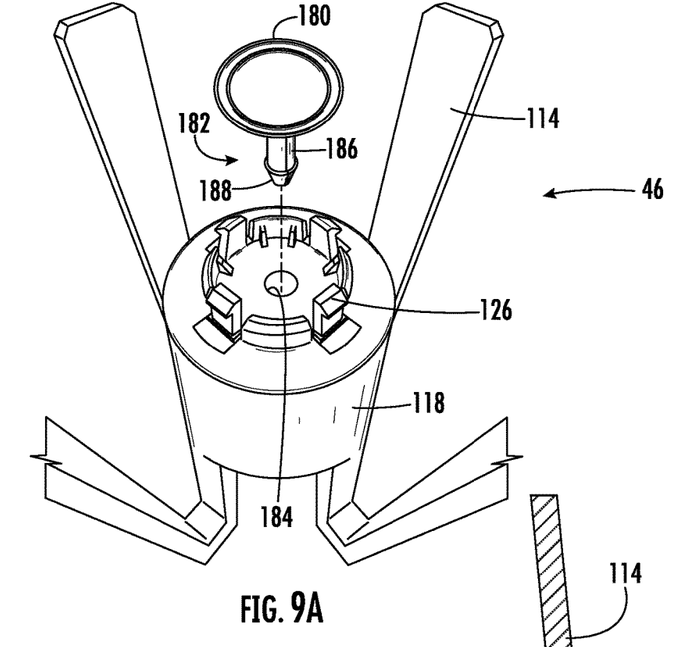
FIGS. 9A-9C are views of another embodiment of the thread protector shown in FIGS. 8A-8G and constructed in accordance with the present disclosure.
Figure 9B:
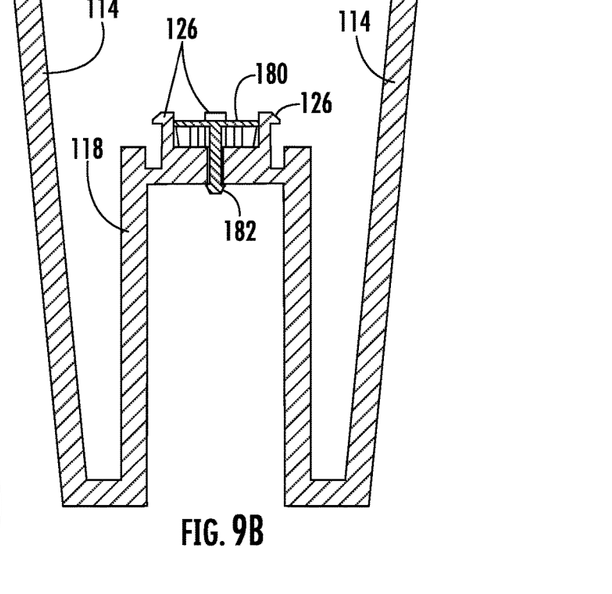
Figure 9C:
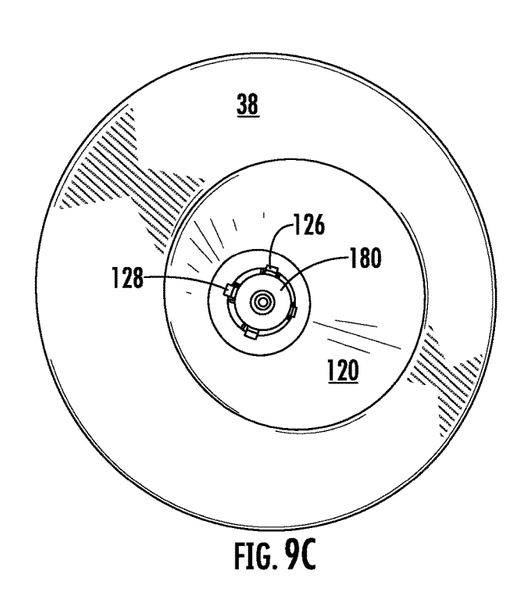

Referring now to FIGS. 9A-9C, shown therein is another embodiment of the thread protector 10 shown in FIGS. 8A-8G. In this embodiment, the securing apparatus 46 can include a disc element 180 to position between the protrusions 126 that extend from the base portion 118 when the base member 120 and the base portion 120 are rotatably engaged. The disc element 180 prevents the protrusions 126 from being able to flex inwards, which could permit the base member 120 and the base portion 118 to not remain secured together. In another embodiment, the disc element 180 can include a securing device 182 extending therefrom to selectively secure the disc element 180 in place by engaging an opening 184 in the base portion 118. The securing device 182 can be made of flexible posts 186 that extend therefrom and have a protrusion portion 188 extending therefrom in a radial direction. The flexible posts 186 of the securing device 182 are forced into and through the opening 184 in the base portion 118 until the protrusion portions 188 are through the opening 184, which holds the disc element 180 in place between the protrusions 126.

Figure 10A:
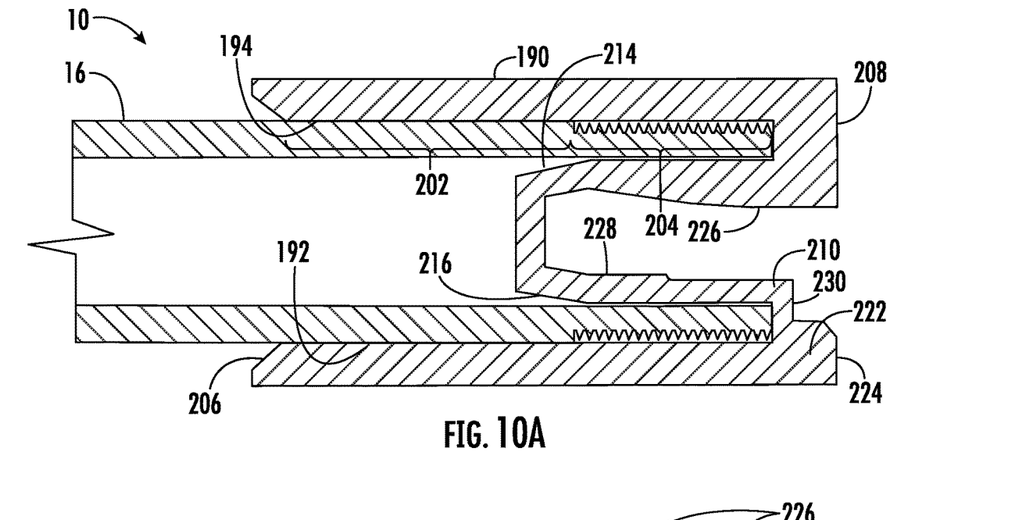
FIGS. 10A-10C are additional views of another embodiment of a thread protector constructed in accordance with the present disclosure.
Figures 10B, 10C:
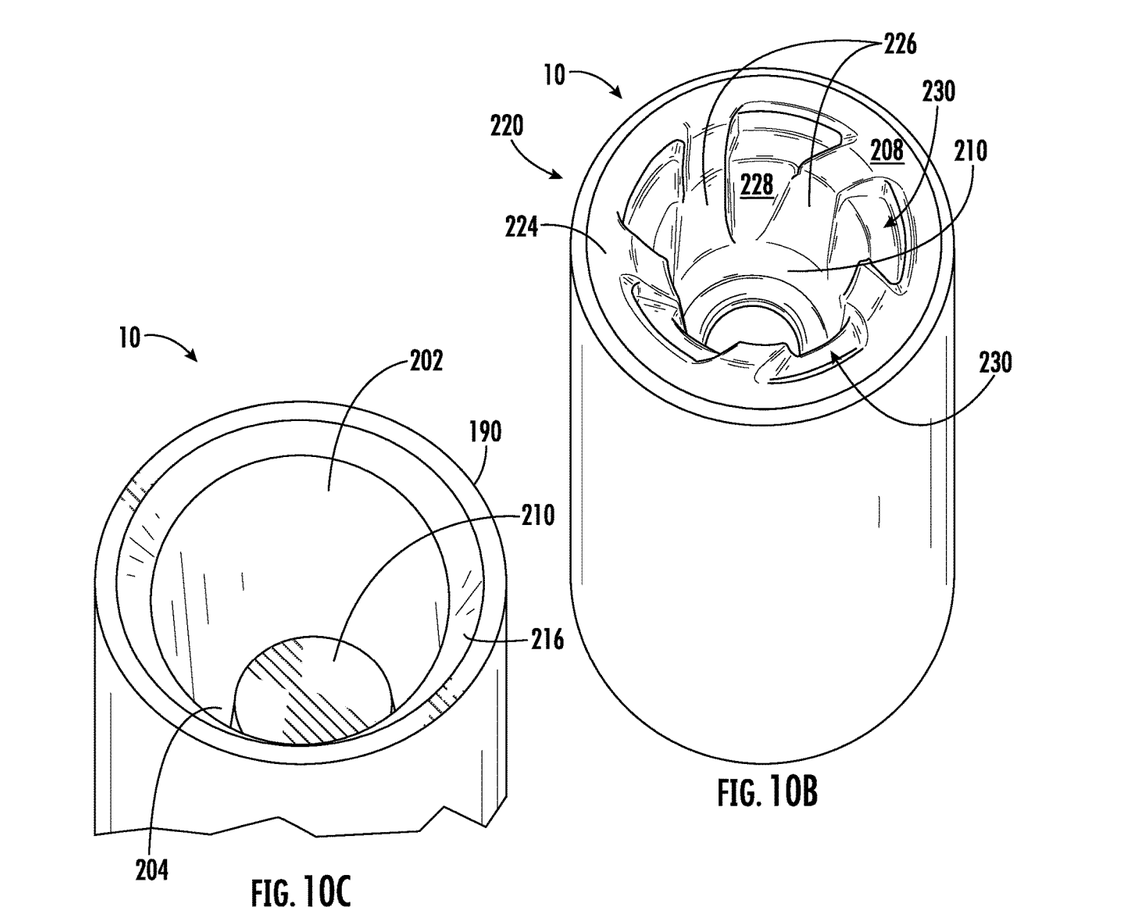

Referring now to FIGS. 10A-10C, shown therein is another embodiment of a thread protector 10. The thread protector 10 in this embodiment includes an external sleeve 190 that is sized to frictionally engage an unthreaded portion 192 of the external side 22 of the tubular member 16 and have a length that is longer than the length of the threads 12 disposed on the pin end 14 of the tubular member 16. The external sleeve 190 can have an inner side 194, an outer side 196, a first end 198, and a second end 200. The inner side 194 of the external sleeve 190 can have an engagement portion 202 that frictionally engages with the unthreaded portion 192 of the external side 22 of the tubular member 16 and a protective portion 204 that covers the threads 12 disposed on the pin end 14 of the tubular member 16. The external sleeve 190 can have a beveled or rounded edge on the corner 206 closest to the tubular member 16 to facilitate initial engagement between the thread protector 10 and the tubular member 16.

In one embodiment of the present disclosure, the thread protector 10 can also include a flange 208 inwardly directed in a radial direction from the first end 32 of the thread protector 10. The flange 208 is positioned so that the pin end 14 of the tubular member 16 can engage the flange 208 to maintain the thread protector 10 in a protective position with respect to the threads 12 on the pin end 14 of the tubular member 16. In another embodiment, an internal sleeve 210 can extend from an inner diameter 212 of the flange 208 in the same direction of the external sleeve 190 of the thread protector 10. The internal sleeve 210 is sized to extend back into the inside of the tubular member 16 to provide additional structural support for the thread protector 10. The internal sleeve 210 can extend any distance back inside the tubular member 16 such that the thread protector 10 is stabilized on the tubular member 16. More specifically, the internal sleeve 210 can extend any distance back inside the tubular member 16 such that the protective portion 204 of the thread protector 10 is prevented from damaging the threads 12 on the pin end 14 of the tubular member 16. In one embodiment, the outer diameter of the internal sleeve 210 is sized such that it is slightly smaller than the inner diameter of the tubular member 16. The outer diameter of the internal sleeve 210 can be sized such that multiple tubular members 16 with varying inner diameters can used with the thread protector 10. In another embodiment, the outer diameter of the internal sleeve 210 is sized such that it is roughly equal to the inner diameter of the tubular member 16 to create some frictional engagement between the internal sleeve 210 and the tubular member 16. In yet another embodiment, the outer diameter of the internal sleeve 210 is sized such that it is slightly larger than the inner diameter of the tubular member 16 to create additional frictional engagement between the thread protector 10 and the tubular member 16.

The corner 214 of the internal sleeve 210 adjacent to the tubular member 16 can be rounded or beveled to facilitate engagement of the thread protector 10 on the tubular member 16. In another embodiment, the internal sleeve 210 can have a tapered portion 216 to facilitate initial engagement of the thread protector 10 on the tubular member 16. The external sleeve 190, the flange 208 and internal sleeve 210 shown in FIG. 1013 can be incorporated in any other embodiment of the thread protector 10 described herein.

For the thread protector 10 to function properly and stay engaged with the tubular member 16 for the desired amount of time and through the various conditions the tubular member 16 will be subject to, the engagement portion 202 of the external sleeve 190 has to be a certain length compared to the protective portion 204 of the external sleeve 190. In one embodiment, the protective portion 204 of the external sleeve 190 is roughly equal to the length of the threads on the tubular member 16. In one embodiment, the length of the engagement portion 202 of the external sleeve 190 is at least 10% of the length of the protective portion 204 of the external sleeve. In another embodiment, the length of the engagement portion 202 of the external sleeve 190 is at least 20% of the length of the protective portion 204 of the external sleeve. In a further embodiment, the length of the engagement portion 202 of the external sleeve 190 is at least 25% of the length of the protective portion 204 of the external sleeve 190. In yet another embodiment, the length of the engagement portion 202 of the external sleeve 190 is at least 35% of the length of the protective portion 204 of the external sleeve 190. In an even further embodiment, the length of the engagement portion 202 of the external sleeve 190 is at least 50% of the length of the protective portion 204 of the external sleeve. In yet an even further embodiment, the length of the engagement portion 202 of the external sleeve 190 is at least 75% of the length of the protective portion 204 of the external sleeve. In another embodiment, the length of the engagement portion 202 of the external sleeve 190 is equal to, or greater than, the length of the protective portion 204 of the external sleeve.

The thread protector 10 shown in FIGS. 10A-10C, can also include an impact protection apparatus 220 that can redistribute impact forces from an outer portion of the thread protector 10 to the internal sleeve 210 to protect the threads 12 of the tubular member 16. Thus, if the thread protector 10 is hit with enough force to break the thread protector 10, the impact protection apparatus 220 directs the break forces to the internal sleeve 210 of the thread protector 10. Directing the break forces to the internal sleeve 210 causes the internal sleeve 210 to break, and not the external sleeve 190 where the threads 12 might be damaged.

The impact protection apparatus 220 can include a block ring 222 disposed around an outer edge and end 224 of the thread protector 10. The block ring 222 can have a radial depth that is less than the radial depth of the flange 208. The impact protection apparatus 220 can include finger elements 226 that extend from the block ring 222, across the flange 208 and down an external side 228 of the internal sleeve 210. The finger elements 226 can have a thickness that decreases as they extend down the external side 228 of the internal sleeve 210. In one embodiment, the depth of the finger elements 226 decrease all the way to zero. The finger elements 226 create pockets 230 that are defined by the cooperation of the block ring 222, the finger elements 226 and the flange 208. The finger elements 222 permit impact forces absorbed by the block ring 222 to be distributed to the finger elements 222 and to the internal sleeve 210. The external sleeve 190, the flange 208 and the internal sleeve 210 shown in FIG. 1013 can be implemented in any thread protector 10 disclosed herein.

The present disclosure is also directed toward a method of removing the thread protectors 10 from the tubular members 16 and using the tubular members 16 in various oil and gas operations. The method is also directed towards securing the thread protectors 10 to the tubular members 16 that are being used in the oil and gas operations.

From the above description, it is clear that the present disclosure is well-adapted to carry out the objectives and to attain the advantages mentioned herein as well as those inherent in the disclosure. While present embodiments have been described herein, it will be understood that numerous changes may be made which will readily suggest themselves to those skilled in the art and which are accomplished within the spirit of the disclosure and claims. Any elements of any embodiments disclosed herein can be combined with any of the other embodiments disclosed herein.

What is claimed is:

1. A thread protector, the thread protector comprising:
an external sleeve to protect threads disposed on a tubular member, the external sleeve having an engagement portion and a protective portion, the engagement portion having an inner diameter that is equal to or smaller than an outer diameter of a threadless portion of the tubular member, the engagement portion frictionally engaging an outer portion of the threadless portion of the tubular member;
a flange disposed on a first end of the external sleeve to be engageable with an end of the tubular member;

an internal sleeve extending from the flange to fit inside the tubular member to prevent the thread protector from wobbling; and a block ring extending around the thread protector adjacent to the flange, the block ring has a radial depth that is less than a radial depth of the flange.

2. The thread protector of claim 1 wherein the protective portion provides contactless protection of the threads of the tubular member.

3. The thread protector of claim 1 wherein the engagement portion has a length that is at least 10 percent of an axial length of the threads on the tubular member.

4. The thread protector of claim 1 wherein the engagement portion has a length that is at least 25 percent of an axial length of the threads on the tubular member.

5. The thread protector of claim 1 wherein the engagement portion has a length that is at least 50 percent of an axial length of the threads on the tubular member.

6. The thread protector of claim 1 wherein the engagement portion has a length that is equal to or greater than an axial length of the threads on the tubular member.

7. The thread protector of claim 1 further comprising finger elements extending radially inward from the block ring and axially along an external surface of the internal sleeve.

8. The thread protector of claim 7 wherein a depth of the finger elements decreases along the external surface of the internal sleeve.

9. A method of protecting pin threads of ends of tubular members, the method comprising:
   installing a thread protector on an end of a tubular member to protect threads disposed on an end of the tubular member, the thread protector comprises:
      an external sleeve to protect threads disposed on a tubular member, the external sleeve having an engagement portion and a protective portion, the engagement portion having an inner diameter that is equal to or smaller than an outer diameter of a threadless portion of the tubular member, the engagement portion frictionally engaging an outer portion of the threadless portion of the tubular member;
      a flange disposed on a first end of the external sleeve to be engageable with an end of the tubular member;
      an internal sleeve extending from the flange to fit inside the tubular member to prevent the thread protector from wobbling; and
      a block ring extending around the thread protector adjacent to the flange, the block ring has a radial depth that is less than a radial depth of the flange.

10. The method of claim 9 wherein the protective portion provides contactless protection of the threads of the tubular member.

11. The method of claim 9 wherein the engagement portion has a length that is at least 10 percent of an axial length of the threads on the tubular member.

12. The method of claim 9 wherein the engagement portion has a length that is at least 25 percent of an axial length of the threads on the tubular member.

13. The method of claim 9 wherein the engagement portion has a length that is at least 50 percent of an axial length of the threads on the tubular member.

14. The method of claim 9 wherein the engagement portion has a length that is equal to or greater than an axial length of the threads on the tubular member.

15. The method of claim 9 further comprising finger elements extending radially inward from the block ring and axially along an external surface of the internal sleeve.

16. The method of claim 15 wherein a depth of the finger elements decreases along the external surface of the internal sleeve.

* * * * *